United States Patent
Minkwitz et al.

(10) Patent No.: US 12,030,991 B2
(45) Date of Patent: Jul. 9, 2024

(54) POLYMER FILM COMPRISING A CO-POLYAMIDE OF AT LEAST ONE DIAMINE, A DICARBOXYLIC ACID AND A DIMER ACID

(71) Applicant: BASF SE, Ludwigshafen am Rhein (DE)

(72) Inventors: Rolf Minkwitz, Ludwigshafen (DE); Andreas Thomas Haedler, Ludwigshafen (DE)

(73) Assignee: BASF SE (DE)

( * ) Notice: Subject to any disclaimer, the term of this patent is extended or adjusted under 35 U.S.C. 154(b) by 0 days.

(21) Appl. No.: 16/331,415

(22) PCT Filed: Sep. 5, 2017

(86) PCT No.: PCT/EP2017/072230
§ 371 (c)(1),
(2) Date: Mar. 7, 2019

(87) PCT Pub. No.: WO2018/050488
PCT Pub. Date: Mar. 22, 2018

(65) Prior Publication Data
US 2019/0194392 A1      Jun. 27, 2019

(30) Foreign Application Priority Data

Sep. 14, 2016  (EP) ..................... 16188757

(51) Int. Cl.
| | |
|---|---|
| C08G 69/26 | (2006.01) |
| B29C 48/08 | (2019.01) |
| B32B 27/08 | (2006.01) |
| B32B 27/34 | (2006.01) |
| C08G 69/14 | (2006.01) |
| C08G 69/28 | (2006.01) |
| C08G 69/34 | (2006.01) |
| C08G 69/36 | (2006.01) |
| C08J 5/18 | (2006.01) |
| C08L 77/06 | (2006.01) |
| B29C 48/00 | (2019.01) |
| B29K 77/00 | (2006.01) |

(52) U.S. Cl.
CPC ............ *C08G 69/265* (2013.01); *B32B 27/08* (2013.01); *B32B 27/34* (2013.01); *C08G 69/14* (2013.01); *C08G 69/26* (2013.01); *C08G 69/28* (2013.01); *C08G 69/34* (2013.01); *C08G 69/36* (2013.01); *C08J 5/18* (2013.01); *B29C 48/022* (2019.02); *B29C 48/08* (2019.02); *B29K 2077/00* (2013.01); *C08J 2377/06* (2013.01)

(58) Field of Classification Search
None
See application file for complete search history.

(56) References Cited

U.S. PATENT DOCUMENTS

| | | | |
|---|---|---|---|
| 3,784,495 A | 1/1974 | Sprauer | |
| 4,387,184 A * | 6/1983 | Coquard | C08L 77/00 525/183 |
| 4,389,521 A * | 6/1983 | Shimada | C08G 69/28 524/708 |
| 5,011,893 A | 4/1991 | Miyamoto et al. | |
| 5,723,567 A * | 3/1998 | Hewel | A22C 13/0013 528/310 |
| 6,172,178 B1 * | 1/2001 | Koning | C08G 69/26 428/411.1 |
| 6,432,548 B1 * | 8/2002 | Alex | B32B 27/08 428/475.8 |
| 9,102,828 B2 * | 8/2015 | Blondel | C08L 77/00 |
| 2003/0232962 A1 | 12/2003 | Scholl et al. | |
| 2006/0003176 A1 | 1/2006 | Scholl et al. | |
| 2010/0203346 A1 * | 8/2010 | Grimes | C08J 5/18 525/183 |
| 2012/0245308 A1 * | 9/2012 | El-Toufaili | C08G 69/265 528/339 |
| 2014/0316062 A1 * | 10/2014 | Janssen | C08L 77/06 528/340 |

FOREIGN PATENT DOCUMENTS

| | | |
|---|---|---|
| CN | 87104650 A | 1/1988 |
| CN | 1190458 A | 8/1998 |
| CN | 1227524 A | 12/1999 |

(Continued)

OTHER PUBLICATIONS

Elçiçek et al., Baü Fen Bil. Enst. Dergisi Cilt 13(1) 26-35 (2011) (Year: 2011).*
CN 101372531 Machine translation used for translated table (Year: 2009).*
U.S. Appl. No. 16/333,105, filed Mar. 13, 2019, Goetz, W., et al.
U.S. Appl. No. 16/332,255, filed Mar. 11, 2019, Minkwitz, R., et al.
U.S. Appl. No. 16/075,388, filed Aug. 3, 2018, US 2019-0040216 A1, Sprafke, J.K., et al.

(Continued)

*Primary Examiner* — Frank J Vineis
*Assistant Examiner* — Nicole T Gugliotta
(74) *Attorney, Agent, or Firm* — Faegre Drinker Biddle & Reath LLP

(57) ABSTRACT

The present invention relates to a polymer film (P) contacting at least one copolyamide. The copolyamide is prepared by polymerizing a first monomer mixture (M1), containing at least one $C_4$-$C_{12}$ dicarboxylic acid and at least one $C_4$-$C_{12}$ diamine, and a second monomer mixture (M2) containing at least one $C_{32}$-$C_{40}$ dimer acid and at least one $C_4$-$C_{12}$ diamine. The present invention further relates to a process for producing the polymer film (P) and to the use of the polymer film (P) for high-temperature applications.

18 Claims, No Drawings

(56) References Cited

FOREIGN PATENT DOCUMENTS

| | | | | |
|---|---|---|---|---|
| CN | 101016378 A | | 8/2007 | |
| CN | 101372531 | * | 2/2009 | ............ C08G 69/00 |
| CN | 102532530 A | | 7/2012 | |
| DE | 28 46 596 A1 | | 5/1979 | |
| EP | 0 352 562 A2 | | 1/1990 | |
| EP | 0 355 017 A2 | | 2/1990 | |
| JP | 2000-924 A | | 1/2000 | |
| RU | 2003134362 A | | 6/2005 | |
| RU | 2010150155 A | | 6/2012 | |

OTHER PUBLICATIONS

U.S. Appl. No. 16/332,986, filed Mar. 13, 2019, Minkwitz, R., et al.
International Search Report dated Dec. 11, 2017 in PCT/EP2017/072230 filed Sep. 5, 2017.
Extended European Search Report dated Mar. 21, 2017 in European Patent Application No. 16188757.5 (with English translation of Category of Cited Documents), 4 pages.

* cited by examiner

POLYMER FILM COMPRISING A CO-POLYAMIDE OF AT LEAST ONE DIAMINE, A DICARBOXYLIC ACID AND A DIMER ACID

The present invention relates to a polymer film (P), comprising at least one copolyamide. The copolyamide is prepared by polymerizing a first monomer mixture (M1) and a second monomer mixture (M2). The present invention further relates to a process for producing the polymer film (P) and to the use of the polymer film (P) for high-temperature applications.

Polyamides are of particular industrial significance, since they feature very good mechanical properties; more particularly, they have high strength and toughness, good chemical stability and high abrasion resistance. They are used, for example, for production of fishing lines, climbing ropes and carpet backings. In addition, polyamides are employed for production of packaging films and packaging sleeves.

An overview of the use as packaging films and packaging sleeves and of processes for production thereof is given, for example, in Encyclopedia of Polymer Science and Engineering 2nd ed., vol. 7, pp. 73-127, Vol. 10, pp. 684-695 (John Wiley & Sons, Inc., 1987). However, the polyamide films described therein are very stiff and have low tear propagation resistance and high density.

For packaging films and packaging sleeves and especially for high-temperature applications, therefore, copolyamides which combine positive properties of different polyamides are often used. The prior art discloses various copolyamides.

EP 0 352 562 describes films composed of copolyamides, wherein the copolyamides have been prepared from ε-caprolactam and preferably 1 to 10 parts by weight of a dimer acid and a diamine. The copolyamides can then be used for production of flat or blown films. They are likewise suitable for production of composite films.

A disadvantage of the films of copolyamide described in EP 0 352 562 is that they have a relatively low tear propagation resistance, a high modulus of elasticity and a low puncture energy and moreover are also only of limited usability, if they are usable at all, for high-temperature applications.

DE 28 46 596 describes shaped bodies made from a copolyamide formed from caprolactam, fatty acid dimers and hexamethylenediamine. However, the copolyamides described cannot be extruded to a film and are accordingly also not suitable for films with high temperature demands.

U.S. Pat. No. 4,387,184 describes polyphasic polyamide compositions. These polyphasic polyamide compositions comprise a polyamide matrix and a phase dispersed therein that likewise comprises a polyamide. These polyphasic polyamide compositions can be processed to films.

Disadvantages of the films described in U.S. Pat. No. 4,387,184 are that they have only low or even zero transparency and that they have poor mechanical properties, especially a high modulus of elasticity and hence high stiffness.

It was thus an object of the present invention to provide a polymer film (P) that comprises a polyamide and has the disadvantages of the polymer films described in the prior art only to a reduced degree, if at all. The polymer film (P) should additionally be producible in a very simple and inexpensive manner.

This object is achieved by a polymer film (P) comprising at least one copolyamide prepared by polymerizing the following components:

(A) 15% to 95% by weight of a first monomer mixture (M1) comprising the following components:
(A1) at least one $C_4$-$C_{12}$ dicarboxylic acid and
(A2) at least one first $C_4$-$C_{12}$ diamine,
(B) 5% to 85% by weight of a second monomer mixture (M2) comprising the following components:
(B1) at least one $C_{32}$-$C_{40}$ dimer acid and
(B2) at least one second $C_4$-$C_{12}$ diamine,
where the percentages by weight of components (A) and (B) are each based on the sum total of the percentages by weight of components (A) and (B).

It has been found that, surprisingly, the polymer film (P) of the invention has high tear propagation resistance both in extrusion direction and at right angles thereto. This is particularly advantageous when the polymer film (P) of the invention is used as packaging film.

Furthermore, the polymer film (P) of the invention has high transparency, and high low-temperature toughness.

It is additionally advantageous that the polymer film (P) of the invention is less stiff than the polymer films (P) described in the prior art that comprise a polyamide or a copolyamide. The polymer film (P) of the invention also has a low modulus of elasticity and a high puncture resistance in the dry state. The high puncture resistance is likewise of particular significance when the polymer film (P) is used as packaging film.

In addition, the polymer film (P) of the invention is also suitable for use at relatively high temperatures, for example at temperatures in the range from 200 to 260° C., preferably in the range from 210 to 250° C.

The invention is elucidated in detail hereinafter.

Polymer Film (P)

According to the invention, the polymer film (P) comprises at least one copolyamide.

In the context of the present invention, "at least one copolyamide" is understood to mean either exactly one copolyamide or a mixture of two or more copolyamides.

The at least one copolyamide is described in detail further down.

The polymer film (P) has a thickness, for example, in the range from 0.1 μm to 1 mm, preferably a thickness in the range from 5 to 500 μm and especially preferably in the range from 20 to 100 pμm.

The present invention therefore also provides a polymer film (P) in which the polymer film (P) has a thickness in the range from 0.1 μm to 1 mm.

The polymer film (P) may, in addition to the at least one copolyamide, comprise at least one further polymer (FP).

In the context of the present invention, "at least one further polymer (FP)" means either exactly one further polymer (FP) or a mixture of two or more further polymers (FP).

Polymers suitable as the at least one further polymer (FP) are all polymers known to those skilled in the art. It will be apparent that the at least one further polymer (FP) is different than the at least one copolyamide.

Preferably, the at least one further polymer (FP) is selected from the group consisting of polyolefins, poly (ethyl-vinyl alcohols), poly(ethyl-vinyl acetates), polyethylene terephthalates, polyvinylidene chlorides, maleic anhydride-grafted polyolefins, polyesters and ionomers. More preferably, the at least one further polymer (FP) is selected from the group consisting of polyolefins, poly(ethylene-vinyl alcohols), poly(ethylene-vinyl acetates), polyethylene terephthalates, polyvinylidene chlorides and maleic anhydride-grafted polyolefins. Most preferably, the at least one further polymer (FP) is selected from the group consisting of polyolefins, maleic anhydride-grafted polyolefins and ethylvinyl alcohols.

If the at least one further polymer (FP) is selected from the group consisting of polyolefins, it is preferable that, in addition, maleic anhydride-grafted polyolefins are used as at least one further polymer (FP). It is possible here that the at least one further polymer (FP) used is a mixture of polyolefins and maleic anhydride-grafted polyolefins. It is likewise possible that, when the polymer film (P) is a multilayer film described below, the polymer film (P) comprises at least one first further layer of at least one further polymer (FP), where the at least one further polymer (FP) of the first further layer is selected from the group consisting of maleic anhydride-grafted polyolefins and the polymer film (P) comprises at least one second further layer of at least one further polymer (FP), where the at least one further polymer (FP) of the second further layer is selected from the group consisting of polyolefins. The polymer film (P) in that case preferably comprises the first further layer between the first layer comprising the at least one copolyamide and the second further layer.

Polyolefins as such are known to those skilled in the art. Preferred polyolefins are polypropylene (PP), low-density polyethylene (LDPE), linear low-density polyethylene (LLDPE) and very low-density polyethylene (VLDPE).

Linear low-density polyethylene (LLDPE) is a copolymer of ethylene and at least one $C_4$-$C_8$-α-olefin. Linear low-density polyethylene (LLDPE) features long polymer chains with short side chains. The length of the side chains in linear low-density polyethylene (LLDPE) is typically shorter than in low-density polyethylene (LDPE) and in medium-density polyethylene (MDPE). The melting point of linear low-density polyethylene (LLDPE) is preferably in the range from 110 to 130° C.; its density is in the range from 0.91 to 0.93 g/cm$^3$.

Very low-density polyethylenes (VLDPE) are copolymers of ethylene and at least one $C_4$-$C_3$-α-olefin. They typically have a melting point in the range from 110 to 130° C. and a density in the range from 0.86 to <0.91 g/cm$^3$. The proportion of $C_4$-$C_8$-α-olefins in VLDPE is generally higher than in LLDPE.

In the context of the present invention, "$C_4$-$C_3$-α-olefins" is understood to mean linear and branched, preferably linear, alkylenes having 4 to 8 carbon atoms that are unsaturated in the α position, i.e. have a C—C double bond in the α position. Examples of these are 1-butene, 1-pentene, 1-hexene, 1-heptene and 1-octene. 1-Butene, 1-hexene and 1-octene are preferred.

Preferred poly(ethylene-vinyl acetates) are copolymers of ethylene with vinyl acetate. For example, they are prepared using in the range from 82% to 99.9% by weight of ethylene and in the range from 0.1% to 18% by weight of vinyl acetate, preferably in the range from 88% to 99.9% by weight of ethylene and in the range from 0.1% to 12% by weight of vinyl acetate.

Preferred poly(ethylene-vinyl alcohols) are obtainable by complete or partial hydrolysis of the above-described poly(ethylene-vinyl acetates). For example, the poly(ethylene-vinyl alcohols) comprise in the range from 50 to 75 mol % of ethylene and in the range from 25 to 50 mol % of vinyl alcohol, based on the total molar amount of the poly(ethylene-vinyl alcohols).

The polymer film (P) may comprise the at least one further polymer (FP) as a blend (mixture) with the at least one copolyamide.

Furthermore, it is possible and preferable in accordance with the invention that the polymer film (P) comprises at least one first layer comprising the at least one copolyamide, and the polymer film (P) comprises at least one further layer comprising the at least one further polymer (FP).

In this embodiment, it is preferable that the at least one first layer comprising the at least one copolyamide does not comprise any further polymer (FP).

In the context of the present invention, "at least one first layer" means either exactly one first layer or two or more first layers.

In the context of the present invention, "at least one further layer" means either exactly one further layer or two or more further layers. Two or more further layers are preferred.

It is thus preferable that the polymer film (P) comprises at least one first layer comprising the at least one copolyamide, and the polymer film (P) also comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides and maleic anhydride-grafted polyolefins.

The present invention thus also provides a polymer film (P), in which the polymer film (P) comprises at least one first layer comprising the at least one copolyamide, and the polymer film (P) comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides and maleic anhydride-grafted polyolefins.

If the polymer film (P), apart from the at least one first layer, does not comprise any further layer, the polymer film (P) is also referred to as a monofilm. If the polymer film (P) is a monofilm, it may comprise exactly one first layer and no further layer; it is likewise possible that it comprises two or more first layers and no further layer. If the polymer film (P) comprises two or more first layers and is a monofilm, the two or more first layers all have the same composition.

If the polymer film (P) comprises at least one first layer comprising the at least one copolyamide, and at least one further layer comprising the at least one further polymer (FP), the polymer film (P) is also referred to as a multilayer film.

For example, the polymer film (P) in that case comprises 1 to 11 first layers comprising the at least one copolyamide, and 1 to 13 further layers comprising the at least one further polymer (FP). Preferably, the polymer film (P) comprises 1 to 5 first layers comprising the at least one copolyamide, and 1 to 11 further layers comprising the at least one further polymer (FP).

Especially preferably, the polymer film (P) comprises 1 to 3 first layers comprising the at least one copolyamide, and 1 to 7 further layers comprising the at least one further polymer (FP).

In a preferred embodiment of the present invention, the at least one first layer consists of the at least one copolyamide. It is likewise preferable that the at least one further layer consists of the at least one further polymer (FP).

In the context of the present invention, the term "polymer film (P)" thus comprises both monofilms and multilayer films.

The present invention therefore also provides a polymer film (P), wherein the polymer film (P) is a monofilm or a multilayer film.

As described above, the polymer film (P) typically has a thickness in the range from 0.1 μm to 1 mm, preferably in the range from 5 to 500 μm and especially preferably in the range from 10 to 100 μm.

If the polymer film (P) is a monofilm and comprises exactly one first layer, the first layer has the same thickness as the polymer film (P), i.e., for example, in the range from 0.1 μm to 1 mm, preferably in the range from 5 to 500 μm and especially preferably in the range from 10 to 100 μm. If the polymer film (P) is a monofilm and comprises two or more first layers, the thickness of every first layer is typically less than the thickness of the polymer film (P). The sum total of the thicknesses of the individual first layers in that case generally corresponds to the thickness of the polymer film (P). For example, the at least one first layer comprising the at least one copolyamide in that case has a thickness in the range from 0.1 to 100 μm, preferably in the range from 0.5 to 50 μm and especially preferably in the range from 0.5 to 15 μm.

If the polymer film (P) is a multilayer film, the thickness of the individual layers of the polymer film (P), i.e. the thickness of the at least one first layer comprising the at least one copolyamide, and the thickness of the at least one further layer comprising the at least one further polymer (FP), is typically less than the thickness of the polymer film (P). The sum total of the thicknesses of the individual layers in that case generally corresponds to the thickness of the polymer film (P).

For example, the at least one first layer comprising the at least one copolyamide in that case has a thickness in the range from 0.1 to 100 μm, preferably in the range from 0.5 to 50 μm and especially preferably in the range from 0.5 to 15 μm.

The at least one further layer comprising the at least one further polymer (FP) in that case has a thickness, for example, in the range from 0.1 to 100 μm, preferably in the range from 0.5 to 50 μm and especially preferably in the range from 0.5 to 15 μm.

The polymer film (P) may comprise at least one adhesion promoter. This embodiment is preferred when the polymer film (P) is a multilayer film.

In the context of the present invention, "at least one adhesion promoter" means either exactly one adhesion promoter or a mixture of two or more adhesion promoters.

If the polymer film (P) is a multilayer film, the at least one adhesion promoter may be present together with the at least one copolyamide in the at least one first layer. It is likewise possible that the at least one adhesion promoter is present together with the at least one further polymer (FP) in the at least one further layer. Furthermore, it is possible that the at least one adhesion promoter is present as at least one additional layer in the polymer film (P). This embodiment is preferred.

When the at least one adhesion promoter is present as at least one additional layer in the polymer film (P), this at least one additional layer is preferably arranged between the at least one further layer comprising the at least one further polymer (FP), and the at least one first layer comprising the at least one copolyamide. The at least one layer of the adhesion promoter has a thickness, for example, in the range from 0.1 to 100 μm, preferably in the range from 0.5 to 50 pm and especially preferably in the range from 0.5 to 15 μm.

Suitable adhesion promoters are known as such to the person skilled in the art. Preferred adhesion promoters are copolymers of ethylene with maleic anhydride or a copolymer of ethylene with vinyl acetate. Preference is given to a copolymer of linear low-density polyethylene (LLDPE) and maleic anhydride or a copolymer of ethylene and vinyl acetate, the copolymer being prepared using >18% by weight of vinyl acetate and <82% by weight of ethylene. These copolymers are commercially available, for example under the Bynel 4105 trade name from DuPont or Escorene FLO0119 from Exxon.

Copolymers of ethylene with maleic anhydride that are used with preference as adhesion promoters are maleic anhydride-grafted polymers or copolymers of ethylene.

The polymer film (P) may also comprise additives. Additives of this kind are known to those skilled in the art and are selected, for example, from the group consisting of stabilizers, dyes, antistats, tackifiers, anti-blockers, processing auxiliaries, antioxidants, light stabilizers, UV absorbers, lubricants and nucleating aids.

Suitable dyes are organic and inorganic pigments, for example titanium dioxide provided with a size. Suitable tackifiers are, for example, polyisobutylene (PIB) or ethyl-vinyl acetate (EVA). Suitable antiblocking agents are, for example, silicon dioxide particles or calcium carbonate particles. Suitable light stabilizers are, for example, what are called HALS (hindered amine light stabilizers). Processing auxiliaries or lubricants used may, for example, be ethylen-ebisstearamide (EBS) wax. Nucleating aids may, for example, be all kinds of organic or inorganic crystallization nucleators, for example talc.

The additives may either be present either in the at least one first layer or in the at least one further layer. They may be present in just one of these layers; it is likewise possible that they are present in each of these layers.

Copolyamide

According to the invention, the polymer film (P) comprises at least one copolyamide prepared by polymerizing the following components:

(A) 15% to 95% by weight of a first monomer mixture (M1) comprising the following components:
(A1) at least one $C_4$-$C_{12}$ dicarboxylic acid and
(A2) at least on first $C_4$-$C_{12}$ diamine,
(B) 5% to 85% by weight of a second monomer mixture (M2) comprising the following components:
(B1) at least one $C_{32}$-$C_{40}$ dimer acid and
(B2) at least one second $C_4$-$C_{12}$ diamine, where the percentages by weight of components (A) and (B) are each based on the sum total of the percentages by weight of components (A) and (B).

The terms "component (A)" and "first monomer mixture (M1)" are used synonymously in the context of the present invention and therefore have the same meaning.

The same applies to the terms "component (B)" and "a monomer mixture (M)". These terms are likewise used synonymously in the context of the present invention and therefore have the same meaning.

According to the invention, the at least one copolyamide has been prepared by polymerizing 15% to 95% by weight of component (A) and 5% to 85% by weight of component (B); preferably, the at least one copolyamide has been prepared by polymerizing 25% to 90% by weight of component (A) and from 10% to 75% by weight of component (B) and especially preferably, the at least one copolyamide has been prepared by polymerizing from 50% to 85% by weight of component (A) and from 15% to 50% by weight of component (B), where the percentages by weight of components (A) and (B) are each based on the sum total of the percentages by weight of components (A) and (B).

Preferably, the sum total of the percentages by weight of components (A) and (B) adds up to 100% by weight.

It will be apparent that the percentages by weight of components (A) and (B) are based on the percentages by weight of components (A) and (B) prior to polymerization, i.e. when components (A) and (B) have not yet reacted with one another. During the polymerization, the weight ratio of components (A) and (B) may change.

According to the invention, the at least one copolyamide is prepared by polymerizing components (A) and (B). The polymerization of components (A) and (B) is known to those skilled in the art. Typically, the polymerization of components (A) and (B) is a condensation reaction. During the polymerization, components (A1) and (A2) and any component (A3) as described further down that are present in component (A) react both with one another and with components (B1) and (B2) present in component (B) and with any component (B3) as described further down that may likewise be present in component (B). Correspondingly, the components (B1) and (B2) present in component (B) and any component (B3) as described further down also react with one another and with components (A1) and (A2) present in component (A) and any (A3). This forms amide bonds between the individual components. Typically, any components (A3) and (B3) present are at least partly in open-chain form during the polymerization, i.e. in the form of an amino acid.

The polymerization of components (A) and (B) may take place in the presence of a catalyst. Suitable catalysts are all catalysts that are known to those skilled in the art and catalyze the polymerization of components (A) and (B). Catalysts of this kind are known to those skilled in the art. Preferred catalysts are phosphorus compounds, for example sodium hypophosphite, phosphorous acid, triphenylphosphine or triphenyl phosphite.

The polymerization of components (A) and (B) forms the at least one copolyamide, which therefore comprises structural units derived from component (A) and structural units derived from component (B). Structural units derived from component (A) comprise structural units derived from components (A1) and (A2) and from any component (A3); structural units derived from component (B) comprise structural units derived from components (B1) and (B2) and from any component (B3).

The polymerization of components (A) and (B) forms the copolyamide as the copolymer. The copolymer may be a random copolymer; it is likewise possible that it is a block copolymer. Preferably, the copolyamide is a block copolymer.

The present invention therefore also provides a polymer film (P) in which the at least one copolyamide is a block copolymer.

In a block copolymer, there is formation of blocks of units derived from component (B) and of blocks of units derived from component (A). These alternate. In the case of a random copolymer, there is alternation of structural units derived from component (A) with structural units derived from component (B). This alternation is random; for example, two structural units derived from component (B) may be followed by one structural unit derived from component (A), which is in turn followed by one structural unit derived from component (B), which is then followed by a structural unit comprising three structural units derived from component (A).

The preparation of the at least one copolyamide preferably comprises the following steps:

a) polymerizing components (A) and (B) to obtain at least one first copolyamide, b) pelletizing the at least one first copolyamide obtained in step a) to obtain at least one pelletized copolyamide, c) extracting the at least one pelletized copolyamide obtained in step b) with water to obtain at least one extracted copolyamide, d) drying the at least one extracted copolyamide obtained in step c) at a temperature ($T_T$) to obtain the at least one copolyamide.

The present invention therefore also provides a polymer film (P) in which the copolyamide is prepared in a process comprising the following steps:

a) polymerizing components (A) and (B) to obtain at least one first copolyamide, b) pelletizing the at least one first copolyamide obtained in step a) to obtain at least one pelletized copolyamide, c) extracting the at least one pelletized copolyamide obtained in step b) with water to obtain at least one extracted copolyamide, d) drying the at least one extracted copolyamide obtained in step c) at a temperature ($T_T$) to obtain the at least one copolyamide.

The polymerization in step a) can take place in any reactors known to those skilled in the art. Preference is given to stirred tank reactors. It is additionally possible to use auxiliaries known to those skilled in the art to improve the reaction regime, for example defoamers such as polydimethylsiloxane (PDMS).

In step b), the at least one first copolyamide obtained in step a) can be pelletized by any methods known to those skilled in the art, for example by means of strand pelletization or underwater pelletization.

The extraction in step c) can be effected by any methods known to those skilled in the art.

During the extraction in step c), by-products that are typically formed during the polymerization of components (A) and (B) in step a) are extracted from the at least one pelletized copolyamide.

In step d), the at least one extracted copolyamide obtained in step c) is dried. Methods of drying are known to those skilled in the art. According to the invention, the at least one extracted copolyamide is dried at a temperature ($T_T$). The temperature ($T_T$) is preferably above the at least one glass transition temperature ($T_{G(C)}$) of the at least one copolyamide and below the melting temperature ($T_{M(C)}$) of the at least one copolyamide.

The drying in step d) is typically effected for a period of time in the range from 1 to 100 hours, preferably in the range from 2 to 50 hours and especially preferably in the range from 3 to 40 hours.

It is envisaged that the drying in step d) will further increase the molecular weight of the at least one copolyamide.

The at least one copolyamide typically has at least one glass transition temperature ($T_{G(C)}$). The at least one glass transition temperature ($T_{G(C)}$) is, for example, in the range from −10 to 70° C., preferably in the range from 10 to 65° C. and especially preferably in the range from 30 to 60° C., determined by means of ISO 11357-2: 2014.

The present invention therefore also provides a polymer film (P) in which the at least one copolyamide has at least one glass transition temperature ($T_{G(C)}$) in the range from −10 to 70° C.

If the at least one copolyamide, in a preferred embodiment of the present invention, is a block copolymer, the at least one copolyamide typically has a first glass transition temperature ($T_{G(C)1}$) and a second glass transition temperature ($T_{G(C)2}$).

In that case, the first glass transition temperature ($T_{G(C)1}$) of the at least one copolyamide is, for example, in the range from 10 to 80° C., preferably in the range from 20 to 70° C. and especially preferably in the range from 30 to 60° C., determined according to ISO 11357-2: 2014.

In that case, the second glass transition temperature ($T_{G(C)2}$) of the at least one copolyamide is, for example, in the range from −15 to 20° C., preferably in the range from −10 to 15° C. and especially preferably in the range from −5 to 10° C., determined according to ISO 11357-2: 2014.

The at least one glass transition temperature ($T_{G(C)}$) and the first glass transition temperature ($T_{G(C)1}$) and second glass transition temperature ($T_{G(C)2}$) of the at least one copolyamide are each based, in accordance with ISO 11357-2: 2014, in the context of the present invention, on the glass transition temperatures of the dry copolyamide.

In the context of the present invention, "dry" means that the at least one copolyamide comprises less than 1% by weight, preferably less than 0.5% by weight and especially preferably less than 0.1% by weight of water, based on the total weight of the at least one copolyamide. More preferably, "dry" means that the at least one copolyamide does not comprise any water and most preferably that the at least one copolyamide does not comprise any solvent.

The at least one copolyamide additionally has a melting temperature ($T_{M(C)}$). The melting temperature ($T_{M(C)}$) of the at least one copolyamide is, for example, in the range from 220 to 290° C., preferably in the range from 230 to 280° C. and especially preferably in the range from 240 to 270° C., determined according to ISO 11357-3: 2014.

The present invention therefore also provides a polymer film (P) in which the at least one copolyamide has a melting temperature ($T_{M(C)}$), where the melting temperature ($T_{M(C)}$) is in the range from 220 to 290° C.

The at least one copolyamide generally has a viscosity number ($VN_{(C)}$) in the range from 120 to 300 mL/g, determined in a 0.5% by weight solution of the at least one copolyamide in 96% by weight sulfuric acid.

Preferably, the viscosity number ($VN_{(C)}$) of the at least one copolyamide is in the range from 135 to 290 mL/g and more preferably in the range from 150 to 280 mL/g, determined in a 0.5% by weight solution of the at least one copolyamide in 96% by weight sulfuric acid.

The present invention therefore also provides a polymer film (P) in which the at least one copolyamide has a viscosity number ($VN_{(C)}$) in the range from 120 to 300 mL/g, determined in a 0.5% by weight solution of the at least one copolyamide in 96% by weight sulfuric acid.

Component (A)

According to the invention, component (A) is a first monomer mixture (M1). The first monomer mixture (M1) comprises components (A1), at least one $C_4$-$C_{12}$ dicarboxylic acid, and (A2), at least one first $C_4$-$C_{12}$ diamine.

In the context of the present invention, a first monomer mixture (M1) is understood to mean a mixture of two or more monomers, where at least components (A1) and (A2) are present in the first monomer mixture (M1).

In the context of the present invention, the terms "component (A)" and "at least one $C_4$-$C_{12}$ dicarboxylic acid" are used synonymously and therefore have the same meaning. The same applies to the terms "component (A2)" and "at least one first $C_4$-$C_{12}$ diamine". These terms are likewise used synonymously in the context of the present invention and therefore have the same meaning.

The first monomer mixture (M1) comprises, for example, in the range from 45 to 55 mol % of component (A1) and in the range from 45 to 55 mol % of component (A2), based in each case on the sum total of the mol % of components (A) and (B), preferably based on the total molar amount of the first monomer mixture (M1).

Preferably, component (A) comprises in the range from 47 to 53 mol % of component (A1) and in the range from 47 to 53 mol % of component (A2), based in each case on the sum total of the mol % of components (A1) and (A2), preferably based on the total molar amount of component (A).

More preferably, component (A) comprises in the range from 49 to 51 mol % of component (A1) and in the range from 49 to 51 mol % of component (A2), based in each case on the sum total of the mol % of components (A1) and (A2), preferably based on the total molar amount of component (A).

The present invention therefore also provides a polymer film (P) in which component (A) comprises in the range from 45 to 55 mol % of component (A1) and in the range from 45 to 55 mol % of component (A2), based in each case on the total molar amount of component (A).

The sum total of the mol % of components (A1) and (A2) present in component (A) typically adds up to 100 mol %.

Component (A) may also additionally comprise a component (A3), at least one lactam.

The present invention therefore also provides a polymer film (P) in which component (A) additionally comprises a component (A3), at least one lactam.

In the context of the present invention the terms "component (A3)" and "at least one lactam" are used synonymously and therefore have the same meaning.

When component (A) additionally comprises component (A3), it is preferable that component (A) comprises in the range from 35 to 49.95 mol % of component (A1), in the range from 35 to 49.95 mol % of component (A2) and in the range from 0.1 to 25 mol % of component (A3), based in each case on the total amount of component (A).

More preferably, component (A) in that case comprises in the range from 37 to 49.95 mol % of component (A1), in the range from 37 to 49.95 mol % of component (A2) and in the range from 0.1 to 20 of component (A3), based in each case on the total amount of component (A).

Most preferably, component (A) in that case comprises in the range from 40 to 49.95 mol % of component (A1), in the range from 40 to 49.95 mol % of component (A2) and in the range from 0.1 to 15 of component (A3), based in each case on the total amount of component (A).

When component (A) additionally comprises component (A3), the molar percentages of components (A1), (A2) and (A3) typically add up to 100 mol %.

In one embodiment of the present invention, the first monomer mixture (M1) does not comprise any component (A3), at least one lactam.

The first monomer mixture (M1) may further comprise water.

Components (A1) and (A2) and optionally component (A3) of component (A) can react with one another to obtain amides. This reaction is known per se to those skilled in the art. Therefore, component (A) may comprise components (A1) and (A2) and optionally component (A3) in fully reacted form, in partly reacted form or in unreacted form. Preferably, component (A) comprises components (A1), (A2) and optionally component (A3) in unreacted form.

In the context of the present invention, "in unreacted form" thus means that component (A1) is present as the at least one $C_4$-$C_{12}$ dicarboxylic acid and component (A2) as the at least one first $C_4$-$C_{12}$ diamine, and any component (A3) as the at least one lactam.

If components (A1) and (A2) and optionally (A3) have at least partly reacted with one another, components (A1) and (A2) and optionally (A3) are at least partly in amide form.

Component (A1)

According to the invention, component (A1) is at least one $C_4$-$C_{12}$ dicarboxylic acid.

In the context of the present invention, "at least one $C_4$-$C_{12}$ dicarboxylic acid" means either exactly one $C_4$-$C_{12}$ dicarboxylic acid or a mixture of two or more $C_4$-$C_{12}$ dicarboxylic acids.

In the context of the present invention, "$C_4$-$C_{12}$ dicarboxylic acid" is understood to mean aliphatic and/or aromatic compounds having 2 to 10 carbon atoms and two carboxyl groups (—COOH groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Substituents of this kind are known to those skilled in the art and are, for example, alkyl or cycloalkyl substituents. Preferably, the at least one $C_4$-$C_{12}$ dicarboxylic acid is unsubstituted.

Examples of suitable components (A1) are selected from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, terephthalic acid and isophthalic acid.

Preferably, component (A1) is selected from the group consisting of pentanedioic acid (glutaric acid), hexanedioic acid (adipic acid), decanedioic acid (sebacic acid), dodecanedioic acid, terephthalic acid and isophthalic acid.

The present invention therefore also provides a polymer film (P) in which component (A1) is selected from the group consisting of pentanedioic acid, hexanedioic acid, decanedioic acid, dodecanedioic acid, terephthalic acid and isophthalic acid.

Especially preferably, component (A1) is hexanedioic acid (adipic acid).

Component (A2)

According to the invention, component (A2) is at least one first $C_4$-$C_{12}$ diamine.

In the context of the present invention, "at least one first $C_4$-$C_{12}$ diamine" means either exactly one first $C_4$-$C_{12}$ diamine or a mixture of two or more first $C_4$-$C_{12}$ diamines.

In the context of the present invention, "$C_4$-$C_{12}$ diamine" is understood to mean aliphatic and/or aromatic compounds having 4 to 12 carbon atoms and two amino groups (–$NH_2$ groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Substituents of this kind are, for example, alkyl or cycloalkyl substituents. These are known as such to those skilled in the art. Preferably, the at least one first $C_4$-$C_{12}$ diamine is unsubstituted.

Examples of suitable components (A2) are selected from the group consisting of 1,4-diaminobutane (butane-1,4-diamine; tetramethylenediamine; putrescine), 1,5-diaminopentane (pentamethylene-1,5-diamine; pentane-1,5-diamine; cadaverine), 1,6-diaminohexane (hexamethylene-1,6-diamine; hexane-1,6-diamine), 1,7-diaminoheptane, 1,8-diaminooctane, 1,9-diaminononane, 1,10-diaminodecane (decamethylene-1,10-diamine), 1,11-diaminoundecane (undecamethylene-1,11-diamine) and 1,12-diaminododecane (dodecamethylene1,12-diamine).

Preferably, component (A2) is selected from the group consisting of butane-1,4-diamine, pentamethylene-1,5-diamine, hexamethylene-1,6-diamine, decamethylene-1,10-diamine and dodecamethylene-1,12-diamine.

The present invention therefore also provides a polymer film (P) in which component (A2) is selected from the group consisting of butane-1,4-diamine, pentamethylene-1,5-diamine, hexamethylene-1,6-diamine, decamethylene-1,10-diamine and dodecamethylene-1,12-diamine.

Component (A3)

Component (A) may additionally comprise component (A3), at least one lactam.

In the context of the present invention, "at least one lactam" means either exactly one lactam or a mixture of two or more lactams.

Lactams are known as such to those skilled in the art. Preference is given in accordance with the invention to lactams having 4 to 12 carbon atoms.

In the context of the present invention, lactams are understood to mean cyclic amides having, in the ring, preferably 4 to 12 and more preferably 5 to 8 carbon atoms.

Suitable lactams are selected, for example, from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam: ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-aminododecanolactam (dodecano-12-lactam; ω-dodecanolactam).

The present invention therefore also provides a polymer film (P) in which component (A3) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam and 12-aminododecanolactam.

The lactams may be unsubstituted or at least monosubstituted. If at least monosubstituted lactams are used, these may bear, on the nitrogen atom and/or on the carbon atoms of the ring, one, two or more substituents independently selected from the group consisting of $C_1$- to $C_{10}$-alkyl, $C_5$- to $C_6$-cycloalkyl and $C_5$- to $C_{10}$-aryl.

Suitable $C_1$- to $C_{10}$-alkyl substituents are, for example, methyl, ethyl, propyl, isopropyl, n-butyl, sec-butyl and tert-butyl. An example of a suitable $C_5$- to $C_6$-cycloalkyl substituent is cyclohexyl. Preferred $C_5$- to $C_{10}$-aryl substituents are phenyl and anthranyl. Preference is given to using unsubstituted lactams, preference being given to γ-lactam (γ-butyrolactam), δ-lactam (δ-valerolactam) and ε-lactam (ε-caprolactam). Particular preference is given to δ-lactam (δ-valerolactam) and ε-lactam (ε-caprolactam), especial preference to ε-caprolactam.

Component (B)

According to the invention, component (B) is a second monomer mixture (M2). The second monomer mixture (M2)

comprises components (B1), at least one $C_{32}$-$C_{40}$ dimer acid and (B2) at least one second $C_4$-$C_{12}$ diamine.

In the context of the present invention, a second monomer mixture (M2) is understood to mean a mixture of two or more monomers, where at least components (B1) and (B2) are present in the second monomer mixture (M2).

In the context of the present invention, the terms "component (B1)" and "at least one $C_{32}$-$C_{40}$ dimer acid" are used synonymously and therefore have the same meaning. The same applies to the terms "component (B2)" and "at least one second $C_4$-$C_{12}$ diamine". These terms are likewise used synonymously in the context of the present invention and therefore have the same meaning.

The second monomer mixture (M2) comprises, for example, in the range from 45 to 55 mol % of component (B1) and in the range from 45 to 55 mol % of component (B2), based in each case on the sum total of the molar percentages of components (B1) and (B2), preferably based on the total molar amount of the second monomer mixture (M2).

Preferably, component (B) comprises in the range from 47 to 53 mol % of component (B1) and in the range from 47 to 53 mol % of component (B2), based in each case on the sum total of the molar percentages of components (B1) and (B2), preferably based on the total molar amount of component (B).

More preferably, component (B) comprises in the range from 49 to 51 mol % of component (B1) and in the range from 49 to 51 mol % of component (B2), based in each case on the sum total of the molar percentages of components (B1) and (B2), preferably based on the total molar amount of component (B).

The present invention therefore also provides a polymer film (P) in which component (B) comprises in the range from 45 to 55 mol % of component (B1) and in the range from 45 to 55 mol % of component (B2), based in each case on the total molar amount of component (B).

The sum total of the mol % of components (B1) and (B2) present in component (B) typically adds up to 100 mol %.

Component (B) may also additionally comprise a component (B3), at least one lactam.

The present invention therefore also provides a polymer film (P) in which component (B) additionally comprises a component (B3), at least one lactam.

The terms "component (B3)" and "at least one lactam" are used synonymously in the context of the present invention and therefore have the same meaning.

In respect of component (B3) which is optionally present in the second monomer mixture (M2), the above-described details and preferences for component (A3) which is optionally present in the first monomer mixture (M1) are correspondingly applicable.

Any component (B3) optionally additionally present in the second monomer mixture (M2) may be the same as or different than any component (A3) optionally present in the first monomer mixture (M1). Preferably, any component (A3) optionally present in the first monomer mixture (M1) and any component (B3) optionally present in the second monomer mixture (M2) are the same.

When component (B) additionally comprises component (B3), it is preferable that component (B) comprises in the range from 35 to 49.95 mol % of component (B1), in the range from 35 to 49.95 mol % of component (B2) and in the range from 0.1 to 25 mol % of component (B3), based in each case on the total molar amount of component (B).

More preferably, component (B) in that case comprises in the range from 37 to 49.95 mol % of component (B1), in the range from 37 to 49.95 mol % of component (B2) and in the range from 0.1 to 20 mol % of component (B3), based in each case on the total molar amount of component (B).

Most preferably, component (B) in that case comprises in the range from 40 to 49.95 mol % of component (B1), in the range from 40 to 49.95 mol % of component (B2) and in the range from 0.1 to 15 mol % of component (B3), based in each case on the total molar amount of component (B).

When component (B) additionally comprises component (B3), the sum total of the molar percentages of components (B1), (B2) and (B3) is typically 100 mole percent.

In one embodiment of the present invention, the second monomer mixture (M2) does not comprise any component (B3), at least one lactam.

The second monomer mixture (M2) may additionally comprise water.

Components (B1) and (B2) and optionally (B3) of component (B) may react with one another to obtain amides. This reaction is known as such to those skilled in the art. Therefore, component (B) may comprise components (B1) and (B2) and optionally (B3) in fully reacted form, in partly reacted form or in unreacted form. Preferably, component (B) comprises components (B1) and (B2) and optionally (B3) in unreacted form.

In the context of the present invention, "in unreacted form" thus means that component (B1) is present in the form of the at least one $C_{32}$-$C_{40}$ dimer acid and component (B2) in the form of the at least one second $C_4$-$C_{12}$ diamine and, if appropriate, component (B3) in the form of the at least one lactam.

If components (B1) and (B2) and, if appropriate, (B3) have at least partly reacted with one another, components (B1) and (B2) and, if appropriate, (B3) are at least partly in amide form.

In respect of component (B2) present in the second monomer mixture (M2), the at least one second $C_4$-$C_{12}$ diamine, the above-described details and preferences for component (A2) present in the first monomer mixture (M1), the at least one first $C_4$-$C_{12}$ diamine, are correspondingly applicable.

The present invention therefore also provides a process in which component (B2) is selected from the group consisting of butane-1,4-diamine, pentamethylene-1,5-diamine, hexamethylene-1,6-diamine, decamethylene-1,10-diamine and dodecamethylene-1,12-diamine.

The present invention therefore also provides a process in which component (A2) and component (B2) are each independently selected from the group consisting of butane-1,4-diamine, pentamethylene-1,5-diamine, hexamethylene-1,6-diamine, decamethylene-1,10-diamine and dodecamethylene-1,12-diamine.

Component (B2) may be the same as or different than component (A2). Preferably, component (B2) is the same as component (A2).

Component (B1)

According to the invention, component (B1) is at least one $C_{32}$-$C_{40}$ dimer acid.

In the context of the present invention, "at least one $C_{32}$-$C_{40}$ dimer acid" means either exactly one $C_{32}$-$C_{40}$ dimer acid or a mixture of two or more $C_{32}$-$C_{40}$ dimer acids.

Dimer acids are also referred to as dimer fatty acids. $C_{32}$-$C_{40}$ dimer acids are known as such to those skilled in the art and are typically prepared by dimerization of unsaturated fatty acids. This dimerization can be catalyzed, for example, by aluminas.

Suitable unsaturated fatty acids for preparation of the at least one $C_{32}$-$C_{40}$ dimer acid are known to those skilled in the art and are, for example, unsaturated $C_{16}$ fatty acids, unsaturated $C_{18}$ fatty acids and unsaturated $C_{20}$ fatty acids.

Preferably, component (B1) is therefore prepared proceeding from unsaturated fatty acids selected from the group consisting of unsaturated $C_{16}$ fatty acids, unsaturated $C_{18}$ fatty acids and unsaturated $C_{20}$ fatty acids, particular preference being given to the unsaturated $C_{18}$ fatty acids.

The present invention therefore also provides a polymer film (P) in which component (B1) is prepared proceeding from unsaturated fatty acids selected from the group consisting of unsaturated $C_{16}$ fatty acids, unsaturated $C_{18}$ fatty acids and unsaturated $C_{20}$ fatty acids.

An example of a suitable unsaturated $C_{16}$ fatty acid is palmitoleic acid ((9Z)-hexadeca-9-enoic acid).

Suitable unsaturated $C_{18}$ fatty acids are selected, for example, from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z, 12Z)-octadeca-9,12-dienoic acid), alpha-linolenic acid ((9Z, 12Z, 15Z)-octadeca-9,12,15-trienoic acid), gamma-linolenic acid ((6Z, 9Z, 12Z)-octadeca-6,9,12-trienoic acid), calendic acid ((8E, 10E, 12Z)-octadeca-8,10,12-trienoic acid), punicic acid ((9Z, 11E, 13Z)-octadeca-9,11,13-trienoic acid), alpha-eleostearic acid ((9Z, 11E, 13E)-octadeca-9,11,13-trienoic acid) and beta-eleostearic acid ((9E, 11E, 13E)-octadeca-9,11,13-trienoic acid). Particular preference is given to unsaturated C18 fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z, 12Z)-octadeca-9,12-dienoic acid).

Suitable unsaturated $C_{20}$ fatty acids are selected, for example, from the group consisting of gadoleic acid ((9Z)-eicosa-9-enoic acid), eicosenoic acid ((11Z)-eicosa-11-enoic acid), arachidonic acid ((5Z, 8Z, 11Z, 14Z)-eicosa-5,8,11,14-tetraenoic acid) and timnodonic acid ((5Z 8Z, 11Z, 14Z, 17Z)-eicosa-5,8,11,14,17-pentaenoic acid).

Component (B1) is especially preferably at least one $C_{36}$ dimer acid.

The at least one $C_{36}$ dimer acid is preferably prepared proceeding from unsaturated $C_{18}$ fatty acids. More preferably, the $C_{36}$ dimer acid is prepared proceeding from $C_{18}$ fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z, 12Z)-octadeca-9,12-diensaure).

In the preparation of component (B1) from unsaturated fatty acids, trimer acids may additionally form; residues of unreacted unsaturated fatty acid may also remain.

The formation of trimer acids is known to those skilled in the art.

Preferably in accordance with the invention, component (B1) comprises not more than 0.5% by weight of unreacted unsaturated fatty acid and not more than 0.5% by weight of trimer acid, more preferably not more than 0.2% by weight of unreacted unsaturated fatty acid and not more than 0.2% by weight of trimer acid, based in each case on the total weight of component (B1).

Dimer acids (also known as dimerized fatty acids or dimer fatty acids) thus refer generally and especially in the context of the present invention to mixtures that are prepared by oligomerization of unsaturated fatty acids. They are preparable, for example, by catalytic dimerization of unsaturated fatty acids from vegetable sources, in which case the starting materials used are especially unsaturated $C_{16}$ to $C_{20}$ fatty acids. The addition is primarily of the Diels-Alder type, and the result, according to the number and position of the double bonds in the fatty acids used for preparation of the dimer acids, is mixtures of primarily dimeric products having cycloaliphatic, linear aliphatic, branched aliphatic and also $C_6$-aromatic hydrocarbyl groups between the carboxyl groups. According to the mechanism and/or any subsequent hydrogenation, the aliphatic radicals may be saturated or unsaturated, and the proportion of aromatic groups may also vary. The radicals between the carboxylic acid groups in that case comprise, for example, 32 to 40 carbon atoms. Preference is given to using fatty acids having 18 carbon atoms for the preparation, such that the dimeric product thus has 36 carbon atoms. Preferably, the radicals that connect the carboxyl groups of the dimer fatty acids do not have any unsaturated bonds or any aromatic hydrocarbyl radicals.

In the context of the present invention, $C_{18}$ fatty acids are thus preferably used in the preparation. Particular preference is given to using linolenic acid, linoleic acid and/or oleic acid.

Depending on the reaction regime, the oligomerization described above gives rise to mixtures comprising mainly dimeric molecules, but also trimeric molecules and also monomeric molecules and other by-products. Purification is typically by distillative means. Commercial dimer acids generally comprise at least 80% by weight of dimeric molecules, up to 19% by weight of trimeric molecules and not more than 1% by weight of monomeric molecules and other by-products.

It is preferable to use dimer acids consisting of dimeric fatty acid molecules to an extent of at least 90% by weight, preferably to an extent of at least 95% by weight, even more preferably to an extent of at least 98% by weight.

The proportions of monomeric, dimeric and trimeric molecules and other by-products in the dimer acids can be determined, for example, by means of gas chromatography (GC). The dimer acids here, prior to the GC analysis, are converted to the corresponding methyl esters via the boron trifluoride method (cf. DIN EN ISO 5509) and then analyzed by means of GC.

A fundamental characteristic of "dimer acids" in the context of the present invention is thus that the preparation thereof comprises the oligomerization of unsaturated fatty acids. This oligomerization gives rise primarily to dimeric products, i.e. preferably to an extent of at least 80% by weight, more preferably to an extent of at least 90% by weight, even more preferably to an extent of at least 95% by weight and especially to an extent of at least 98% by weight. The fact that the oligomerization thus gives rise predominantly to dimeric products comprising exactly two fatty acid molecules justifies this name, which is in common use in any case. An alternative expression for the term "dimer acids" in question is thus "mixture comprising dimerized fatty acids".

The dimer acids to be used are obtainable as commercial products. Examples of these include Radiacid 0970, Radiacid 0971, Radiacid 0972, Radiacid 0975, Radiacid 0976 and Radiacid 0977 from Oleon, Pripol 1006, Pripol 1009, Pripol 1012, and Pripol 1013 from Croda, Empol 1008, Empol 1012, Empol 1061 and Empol 1062 from BASF SE, and Unidyme 10 and Unidyme TI from Arizona Chemical.

Component (B1) has an acid number, for example, in the range from 190 to 200 mg KOH/g.

Production of the Polymer Film (P)

The polymer film (P) is preferably produced in a process comprising the following steps:

i) providing at least one copolyamide; prepared by polymerization of the following components:
- (A) 15% to 95% by weight of a first monomer mixture (M1) comprising the following components:
  - (A1) at least one $C_4$-$C_{12}$ dicarboxylic acid and
  - (A2) at least one first $C_4$-$C_{12}$ diamine,
- (B) 5% to 85% by weight of a second monomer mixture (M2) comprising the following components:
  - (B1) at least one $C_{32}$-$C_{40}$ dimer acid and
  - (B2) at least one second $C_4$-$C_{12}$ diamine,
- where the percentages by weight of components (A) and (B) are based in each case on the sum total of the percentages by weight of components (A) and (B), in molten form in a first extruder, ii) extruding the at least one copolyamide in molten form provided in step i) out of the first extruder through a die to obtain a film of the at least one polyamide in molten form, iii) cooling the film obtained in step ii) of the at least one copolyamide in molten form, with solidification of the at least one copolyamide to obtain the polymer film (P).

The present invention therefore also provides a process for producing a polymer film (P) of the invention, comprising the steps of i) providing at least one copolyamide prepared by polymerization of the following components:
- (A) 15% to 95% by weight of a first monomer mixture (M1) comprising the following components:
  - (A1) at least one $C_4$-$C_{12}$ dicarboxylic acid and
  - (A2) at least one first $C_4$-$C_{12}$ diamine,
- (B) 5% to 85% by weight of a second monomer mixture (M2) comprising the following components:
  - (B1) at least one $C_{32}$-$C_{40}$ dimer acid and
  - (B2) at least one second $C_4$-$C_{12}$ diamine,
- where the percentages by weight of components (A) and (B) are based in each case on the sum total of the percentages by weight of components (A) and (B) in molten form in a first extruder, ii) extruding the at least one copolyamide in molten form provided in step i) out of the first extruder through a die to obtain a film of the at least one copolyamide in molten form, iii) cooling the film of the at least one copolyamide in molten form obtained in step ii), with solidification of the at least one copolyamide to obtain the polymer film (P).

In step i), the at least one copolyamide in molten form is provided in a first extruder.

In the context of the present invention, "a first extruder" means either exactly one first extruder or two or more first extruders. Typically, as many first extruders are used as first layers comprising the at least one copolyamide are to be present in the polymer film (P).

If the polymer film (P) is to comprise, for example, exactly one first layer comprising the at least one copolyamide, exactly one first extruder is used. If the polymer film (P) is to comprise exactly two first layers comprising the at least one copolyamide, exactly two first extruders are used. If the polymer film (P) is to comprise exactly five first layers comprising the at least one copolyamide, exactly five first extruders are used.

For example, 1 to 11 first extruders are used, preferably 1 to 5 first extruders and more preferably 1 to 3 first extruders.

In respect of the at least one copolyamide which is provided in step i), the above-described embodiments and preferences for the at least one copolyamide present in the polymer film (P) are correspondingly applicable.

According to the invention, the at least one copolyamide is provided in molten form.

In the context of the present invention, "in molten form" means that the at least one copolyamide is provided at a temperature above the melting temperature ($T_{M(C)}$) of the at least one copolyamide. "In molten form" thus means that the at least one copolyamide is at a temperature above the melting temperature ($T_{M(C)}$) of the at least one copolyamide. If the at least one copolyamide is in molten form, the at least one copolyamide is free-flowing.

"Free-flowing" means that the at least one copolyamide can be conveyed within the first extruder and that the at least one copolyamide can be extruded out of the first extruder.

For example, the at least one copolyamide is provided in step i) at a temperature in the range from 210 to 340° C., preferably in the range from 240 to 330° C. and especially preferably in the range from 270 to 320° C., in each case with the proviso that the temperature at which the at least one copolyamide is provided is above the melting temperature ($T_{M(C)}$) of the at least one copolyamide.

The at least one copolyamide can be provided in molten form in the first extruder by any methods known to those skilled in the art.

For example, the at least one copolyamide can be supplied to the first extruder in molten form or in solid form. If the at least one copolyamide is supplied to the first extruder in solid form, it can be supplied to the first extruder, for example, in the form of pellets and/or in the form of powder. The at least one copolyamide is then melted in the first extruder and thus provided in molten form in the first extruder. This embodiment is preferred.

In addition, it is possible that components (A) and (B) are polymerized directly in the first extruder and the at least one copolyamide is thus provided in molten form in the first extruder. Processes for this purpose are known to those skilled in the art.

In step ii), the at least one copolyamide in molten form is extruded out of the first extruder through a die to obtain a film of the at least one copolyamide in molten form.

In the context of the present invention, "a die" means either exactly one die or two or more dies. Preference is given in accordance with the invention to exactly one die.

Suitable dies are all dies known to those skilled in the art that enable extrusion of a film composed of the at least one copolyamide in molten form. Examples of dies of this kind are annular dies or slot dies.

Suitable annular dies and slot dies are known as such to those skilled in the art.

If, for example, the step i1) described further down is conducted, it is preferable that, in step ii), the at least one copolyamide in molten form from the first extruder is combined with the at least one further polymer (FP) in molten form from the further extruder in the die, for example in the annular die or in the slot die.

More particularly, in step ii), the at least one copolyamide in molten form from the first extruder is combined with the at least one further polymer (FP) in molten form from the further extruder in the die in such a way that the film obtained in step ii) of the at least one copolyamide and the at least one further polymer (FP), each in molten form, comprises at least one first layer comprising the at least one copolyamide in molten form, and at least one further layer comprising the at least one further polymer (FP) in molten form.

For example, the thickness of the film of the at least one copolyamide in molten form is in the range from 0.1 µm to 1 mm, preferably in the range from 5 to 500 µm and especially preferably in the range from 20 to 100 µm.

The film of the at least one copolyamide in molten form may, for example, be a flat film or a tubular film. A tubular film is typically obtained when the die used is an annular die; a flat film is obtained when the die used is a slot die.

In step iii), the film obtained in step ii) of the at least one copolyamide in molten form is cooled down. This results in solidification of the at least one copolyamide to obtain the polymer film (P).

Suitable methods of cooling of the film of the at least one copolyamide in molten form are all those known to the person skilled in the art. For example, the film of the at least one copolyamide in molten form can be cooled by air or water cooling or by contact with a cold surface.

The film of the at least one copolyamide in molten form is cooled down in step iii), for example, to a temperature below the melting temperature ($T_{M(C)}$) of the at least one copolyamide to obtain the polymer film (P). Preferably, the film of the at least one copolyamide in molten form in step iii) is cooled down to a temperature below the at least one glass transition temperature ($T_{G(C)}$) of the at least one copolyamide.

For example, the film of the at least one copolyamide in molten form is cooled down in step iii) to a temperature in the range from 0 to 100° C., preferably in the range from 10 to 80° C. and especially preferably in the range from 15 to 70° C., the temperature to which the film of the at least one copolyamide in molten form is cooled down being below the melting temperature ($T_{M(C)}$), preferably below the at least one glass transition temperature ($T_{G(C)}$), of the at least one copolyamide.

The present invention therefore also provides a process for producing a polymer film (P) in which, in step iii), the film of the at least one copolyamide in molten form is cooled down to a temperature below the melting temperature ($T_{M(C)}$) of the at least one copolyamide.

In respect of the polymer film (P) obtained in step iii), the embodiments and preferences described in respect of the polymer film (P) of the invention are correspondingly applicable.

Steps ii) and iii) can be conducted successively or simultaneously.

Preference is given to additionally conducting a step i1) in which at least one further polymer (FP) in molten form is provided in a further extruder.

In that case, the process for producing the polymer film (P) comprises the following steps:
  i) providing at least one copolyamide prepared by polymerizing the following components:
    (A) 15% to 95% by weight of a first monomer mixture (M1) comprising the following components:
      (A1) at least one $C_4$-$C_{12}$ dicarboxylic acid and
      (A2) at least one first $C_4$-$C_{12}$ diamine,
    (B) 5% to 85% by weight of a second monomer mixture (M2) comprising the following components:
      (B1) at least one $C_{32}$-$C_{40}$ dimer acid and
      (B2) at least one second $C_4$-$C_{12}$ diamine,
    where the percentages by weight of components (A) and (B) are each based on the sum total of the percentages by weight of components (A) and (B), in molten form in a first extruder,
  i1) providing at least one further polymer (FP) in molten form in a further extruder,
  ii) extruding the at least one copolyamide in molten form provided in step i) out of the first extruder through a die and extruding the at least one further polymer (FP) in molten form provided in step i1) from the further extruder through the die to obtain a film of the at least one copolyamide and the at least one further polymer (FP), each in molten form,
  iii) cooling the film obtained in step ii) of the at least one copolyamide and the at least one further polymer (FP), each in molten form, with solidification of the at least one copolyamide and/or the at least one further polymer (FP) to obtain the polymer film (P).

In step i1), the at least one further polymer (FP) in molten form is provided in a further extruder.

In the context of the present invention, "a further extruder" means either exactly one further extruder or two or more further extruders. Preference is given to two or more further extruders.

Preference is given to using as many further extruders as further layers comprising the at least one further polymer (FP) are to be present in the polymer film (P). For example, 1 to 13 further extruders are used, preferably 1 to 11 further extruders and especially preferably 1 to 7 further extruders.

If the polymer film (P), for example, is to comprise exactly one further layer comprising the at least one further polymer (FP), exactly one further extruder is used. If the polymer film (P) is to comprise exactly two further layers comprising the at least one further polymer (FP), exactly two further extruders are used. If the polymer film (P) is to comprise exactly five further layers comprising the at least one further polymer (FP), exactly five further extruders are used.

In respect of the further extruder, the embodiments and preferences described above for the first extruder are correspondingly applicable.

In respect of the at least one further polymer (FP), the embodiments and preferences described above for the at least one further polymer (FP) that may be present in the polymer film (P) are correspondingly applicable.

According to the invention, the at least one further polymer (FP) in step i1) is provided in molten form. "In molten form" means the at least one further polymer (FP) is provided at a temperature above the melting temperature ($T_{M(FP)}$) of the at least one further polymer (FP). "In molten form" thus means that the at least one further polymer (FP) is at a temperature above the melting temperature ($T_{M(FP)}$) of the at least one further polymer (FP). If the at least one further polymer (FP) is in molten form, the at least one further polymer (FP) is free-flowing.

"Free-flowing" means that the at least one further polymer (FP) can be conveyed within the further extruder and that the at least one further polymer (FP) can be extruded out of the further extruder.

For example, the at least one further polymer (FP) in step i1) is provided at a temperature in the range from 120 to 350° C., preferably in the range from 130 to 300° C. and especially preferably in the range from 140 to 250° C., in each case with the proviso that the temperature at which the at least one further polymer (FP) is provided is above the melting temperature ($T_{M(FP)}$) of the at least one further polymer (FP).

The at least one further polymer (FP) may be provided in molten form in the further extruder by any methods known to those skilled in the art.

For example, the at least one further polymer (FP) can be supplied to the further extruder in molten form or in solid form. If the at least one further polymer (FP) is supplied to the further extruder in solid form, it can be supplied to the further extruder, for example, in the form of pellets and/or in the form of powder. In that case, the at least one further polymer (FP) is melted in the further extruder and thus provided in molten form in the further extruder.

Step i1) is typically conducted simultaneously with step i).

In respect of steps i), ii) and iii) when step i1) is conducted, the embodiments and preferences described above for steps i), ii) and iii) when step i1) is not conducted are applicable.

The film obtained in step ii) of the at least one copolyamide and of the at least one further polymer (FP), each in molten form, comprises the at least one copolyamide in at least one first layer and the at least one further polymer (FP) in at least one further layer. Typically, the film obtained in step ii) has as many first layers comprising the at least one copolyamide in molten form as first extruders were used in step i) and as many further layers comprising the at least one further polymer (FP) in molten form as further extruders were used in step i1).

It will be apparent that, when step i1) is conducted, the polymer film (P) obtained in step iii) is a multilayer film.

Preferably, the polymer film (P) is stretched. The polymer film (P) can be stretched after step iii); it is likewise possible to stretch the polymer film (P) during step iii), i.e. during the cooling of the film of the at least one copolyamide and optionally of the at least one further polymer (FP).

The present invention therefore also provides a process in which the following step is additionally conducted:

iv) stretching the polymer film (P) to obtain a stretched polymer film (SP).

Steps iii) and iv) can be conducted successively or simultaneously.

In the stretching of the polymer film (P), the polymer chains of the at least one copolyamide become aligned and the crystallinity of the at least one copolyamide can increase.

It is additionally possible that the polymer chains of any at least one further polymer (FP) present in the polymer film (P) are aligned in the course of stretching. This can also increase the crystallinity of the at least one further polymer (FP).

The stretching can be effected by any methods known to those skilled in the art.

For example, the polymer film (P) can be stretched by guiding it over at least one roll, preferably a roll system, or by extending it widthwise. If the polymer film (P) is obtained in the form of a tube, it is likewise possible that the polymer film (P) is stretched by blowing air into the tube of the polymer film (P) and hence stretching the polymer film (P). It will be appreciated that combinations of the methods are also possible.

When the polymer film (P) is guided over at least one roll, preferably through a roll system, the polymer film (P) is stretched in extrusion direction, i.e. lengthwise. If the polymer film (P), by contrast, is extended widthwise, it is stretched at right angles to extrusion direction.

If the polymer film (P), for stretching, is guided over at least one roll, preferably through a roll system, the polymer chains of the at least one copolyamide and of any at least one further polymer (FP) are aligned parallel to the direction in which stretching is effected. The stretched polymer film (SP) obtained is then uniaxially oriented. The stretched polymer film obtained (SP) is likewise uniaxially oriented when the polymer film (P), for stretching, is extended widthwise. In that case too, the polymer chains of the at least one copolyamide and of any at least one further polymer (FP) are aligned parallel to the direction in which stretching is effected.

"Uniaxially oriented" means that the polymer chains are aligned essentially in one direction.

If the polymer film (P), for stretching, is guided over a roll system and additionally extended widthwise, the polymer chains of the at least one copolyamide and of any at least one further polymer (FP) are aligned parallel to both directions in which stretching is effected. The stretched polymer film (SP) obtained is then biaxially oriented.

"Biaxially oriented" means that the polymer chains are aligned essentially in two different directions, preferably at right angles to one another.

If the polymer film (P) is obtained in tubular form and the polymer film (P) is stretched by blowing air into the tube of the polymer film (P), the stretched polymer film (SP) obtained is uniaxially oriented.

If the above-described processes for stretching the polymer film (P) are combined, the polymer film (P) is thus obtained, for example, in tubular form and the polymer film (P) is stretched by blowing air into the tube of the polymer film (P) and simultaneously guided over rolls and likewise stretched; thus, the stretched polymer film (SP) obtained is biaxially oriented.

The polymer film (P) is typically stretched at a temperature above the at least one glass transition temperature ($T_{G(C)}$) of the at least one copolyamide and below the melting temperature ($T_{M(C)}$) of the at least one copolyamide. It the polymer film (P) is a multilayer film, it is also preferable that the polymer film (P) is stretched at a temperature below the melting temperature ($T_{M(FP)}$) of the at least one further polymer (FP), especially preferably at a temperature below the melting temperature of the at least one further polymer (FP) having the lowest melting temperature.

The polymer film (P) of the invention can be produced, for example, in a casting process, in a blowing process, in a biaxially oriented polyamide film process (BOPA process) or in a multifilm blowing process.

The present invention therefore also provides a polymer film (P) which is produced in a casting process, in a blowing process, in a biaxially oriented polyamide film process or in a multifilm blowing process.

The casting process, the blowing process the biaxially oriented polyamide film process and the multifilm blowing process are known as such to those skilled in the art. Typically, the polymer film (P) is stretched in these processes, such that a stretched polymer film (P) is obtained.

A casting process for producing the polymer film (P) preferably comprises the following steps i-c) to iv-c):

i-c) providing at least one copolyamide prepared by polymerizing the following components:
(A) 15% to 95% by weight of a first monomer mixture (M1) comprising the following components:
(A1) at least one $C_4$-$C_{12}$ dicarboxylic acid and
(A2) at least one first $C_4$-$C_{12}$ diamine,
(B) 5% to 85% by weight of a second monomer mixture (M2) comprising the following components:
(B1) at least one $C_{32}$-$C_{40}$ dimer acid and
(B2) at least one second $C_4$-$C_{12}$ diamine,
where the percentages by weight of components (A) and (B) are each based on the sum total of the percentages by weight of components (A) and (B), in molten form in a first extruder, ii-c) extruding the at least one copolyamide in molten form provided in step i-c) out of the first extruder through a die to obtain a film of the at least one copolyamide in molten form, iii-c) cooling the film of the at least one copolyamide in molten form obtained in step ii-c), with solidification of the at least one copolyamide to obtain the polymer film (P), iv-c) stretching the polymer film (P) obtained in step iii-c) by guiding the polymer film (P) over at least one roll, preferably over a roll system, to obtain a stretched polymer film (SP).

In respect of steps i-c) to iii-c) of the casting process, the embodiments and preferences described above for steps i) to iii) of the process for producing the polymer film (P) are correspondingly applicable.

The die used in the casting process in step ii-c) is typically a slot die. The film of the at least one copolyamide in molten form obtained in step ii-c) is therefore preferably a flat film, and so the polymer film (P) obtained in step iii-c) and the stretched polymer film (SP) obtained in step iv-c) are preferably flat films.

In the casting process, steps iii-c) and iv-c) can be conducted successively or simultaneously. Preferably, in the casting process, steps iii-c) and iv-c) are conducted simultaneously; especially preferably, steps iii-c) and iv-c) are conducted simultaneously and directly after step ii-c).

It is also preferable that, in the casting process, the at least one roll used in step iv-c), preferably the roll system, is cooled during step iv-c).

A blowing process for producing the polymer film (P) preferably comprises the following steps i-b) to iv-b):

i-b) providing at least one copolyamide prepared by polymerizing the following components:
(A) 15% to 95% by weight of a first monomer mixture (M1) comprising the following components:
(A1) at least one $C_4$-$C_{12}$ dicarboxylic acid and
(A2) at least one first $C_4$-$C_{12}$ diamine,
(B) 5% to 85% by weight of a second monomer mixture (M2) comprising the following components:
(B1) at least one $C_{32}$-$C_{40}$ dimer acid and
(B2) at least one second $C_4$-$C_{12}$ diamine,
where the percentages by weight of components (A) and (B) are each based on the sum total of the percentages by weight of components (A) and (B), in molten form in a first extruder, ii-b) extruding the at least one copolyamide in molten form provided in step i-b) out of the first extruder through a die, which is an annular die, to obtain a tubular film of the at least one copolyamide in molten form, iii-b) cooling the tubular film of the at least one copolyamide in molten form obtained in step ii-b), with solidification of the at least one copolyamide to obtain the polymer film (P), iv-b) stretching the polymer film (P) obtained in step iii-b) by blowing air into the tube of the polymer film (P) to obtain a stretched polymer film (SP).

In respect of steps i-b) to iii-b) of the blowing process, the embodiments and preferences described above for steps i) to iii) of the process for producing the polymer film (P) are correspondingly applicable.

The die used in step ii-b) of the blowing process is preferably a stack die, a helical distributor die or a mixed form thereof. These dies are known to those skilled in the art and are described, for example, in "Blown Film Extrusion" by Kirk Cantor, 2nd Edition, Carl Hanser Verlag, Munich 2011.

Steps iii-b) and iv-b) in the blowing process can be conducted simultaneously or successively. Preferably, in the blowing process, steps iii-b) and iv-b) are conducted simultaneously.

It will be apparent that, when steps iii-b) and iv-b) in the blowing process are conducted simultaneously, the tubular film of the at least one copolyamide obtained in molten form in step ii-b) is cooled down in step iii-b) and simultaneously stretched by blowing air into the tubular film to obtain the stretched polymer film (SP).

A biaxially oriented polyamide film process for producing the polymer film (P) preferably comprises the following steps i-o) to iv-o):

i-o) providing at least one copolyamide prepared by polymerizing the following components:
(A) 15% to 95% by weight of a first monomer mixture (M1) comprising the following components:
(A1) at least one $C_4$-$C_{12}$ dicarboxylic acid and
(A2) at least one first $C_4$-$C_{12}$ diamine,
(B) 5% to 85% by weight of a second monomer mixture (M2) comprising the following components:
(B1) at least one $C_{32}$-$C_{40}$ dimer acid and
(B2) at least one second $C_4$-$C_{12}$ diamine,
where the percentages by weight of components (A) and (B) are each based on the sum total of the percentages by weight of components (A) and (B), in molten form in a first extruder, ii-o) extruding the at least one copolyamide in molten form provided in step i-o) out of the first extruder through a die to obtain a film of the at least one copolyamide in molten form, iii-o) cooling the film of the at least one copolyamide in molten form obtained in step ii-o), with solidification of the at least one copolyamide to obtain the polymer film (P), iv-o) stretching the polymer film (P) obtained in step iii-o) by guiding the polymer film (P) over at least one roll, preferably over a roll system, and lengthening the width thereof to obtain the stretched polymer film (SP).

In respect of steps i-o) to iii-o) of the biaxially oriented polyamide film process, the embodiments and preferences described above for steps i) to iii) of the process for producing the polymer film (P) are correspondingly applicable.

The die used in the biaxially oriented polyamide film process in step ii-o) is typically a slot die. The film of the at least one copolyamide in molten form obtained in step ii-o) is therefore preferably a flat film, and so the polymer film (P) obtained in step iii-o) and the stretched polymer film (SP) obtained in step iv-o) are preferably flat films.

In the biaxially oriented polyamide film process, steps iii-o) and iv-o) can be conducted successively or simultaneously; preference is given to conducting steps iii-o) and iv-o) successively. Especially preferably, in the biaxially oriented polyamide film process, steps iii-o) and iv-o) are conducted successively and the polymer film (P) obtained in step iii-o) is heated prior to step iv-o). It is preferable here that the polymer film (P) is heated prior to step iv-o) to a temperature above the at least one glass transition temperature ($T_{G(C)}$) of the at least one copolyamide present in the polymer film (P) and below the melting temperature ($T_{M(C)}$) of the at least one copolyamide present in the polymer film (P). The polymer film (P) is then preferably stretched in step iv-o) at the temperature to which it is heated prior to step iv-o).

A multifilm blowing process for producing the polymer film (P) preferably comprises the following steps i-m) to iv-m):

i-m) providing at least one copolyamide prepared by polymerizing the following components:
(A) 15% to 95% by weight of a first monomer mixture (M1) comprising the following components:
(A1) at least one $C_4$-$C_{12}$ dicarboxylic acid and
(A2) at least one first $C_4$-$C_{12}$ diamine,
(B) 5% to 85% by weight of a second monomer mixture (M2) comprising the following components:
(B1) at least one $C_{32}$-$C_{40}$ dimer acid and
(B2) at least one second $C_4$-$C_{12}$ diamine,
where the percentages by weight of components (A) and (B) are each based on the sum total of the percentages by weight of components (A) and (B), in molten form in a first extruder,
ii-m) extruding the at least one copolyamide in molten form provided in step i-m) out of the first extruder through a die, which is an annular die, to obtain a tubular film of the at least one copolyamide in molten form,
iii-m) cooling the tubular film of the at least one copolyamide in molten form obtained in step ii-m), with solidification of the at least one copolyamide to obtain the polymer film (P),
iv-m) stretching the polymer film (P) obtained in step iii-m) by blowing air into the tube of the polymer film (P) and by at the same time guiding the polymer film (P) over at least one roll, preferably over a roll system, to obtain a stretched polymer film (SP).

In respect of steps i-m) to iii-m) of the multifilm blowing process, the embodiments and preferences described above for steps i) to iii) of the process for producing the polymer film (P) are correspondingly applicable.

Preferably, the tubular film of the at least one copolyamide in molten form is cooled down in a water bath in step iii-m).

In the multifilm blowing process, steps iii-m) and iv-m) can be conducted successively or simultaneously; preference is given to conducting steps iii-m) and iv-m) successively. Especially preferably, steps iii-m) and iv-m) are conducted successively and the polymer film (P) obtained in step iii-m) is heated prior to step iv-m). It is preferable here that the polymer film (P) is heated prior to step iv-m) to a temperature above the at least one glass transition temperature ($T_{G(C)}$) of the at least one copolyamide present in the polymer film (P) and below the melting temperature ($T_{M(C)}$) of the at least one copolyamide present in the polymer film (P). The polymer film (P) is then preferably stretched in step iv-m) at the temperature to which it is heated prior to step iv-m).

It will be apparent that, in the casting process, in the blowing process, in the biaxially oriented polyamide film process and in the multifilm blowing process it is likewise optionally possible to conduct step i1) in which at least one further polymer (FP) is provided in molten form in a further extruder and that in that case, correspondingly, step ii) of the process for producing the polymer film (P), in step ii-c), in step ii-b) in step ii-o) and in step ii-m), a film of the at least one copolyamide and of the at least one further polymer (FP), each in molten form, is obtained and this is cooled down in accordance with step iii) of the process for producing the polymer film (P) in step iii-c), in step iii-b) in step ii-o) and in step ii-m).

In respect of the optionally conducted step i1), the embodiments and preferences described above for the optionally conducted step i1) of the process for producing the polymer film (P) are correspondingly applicable.

Preferably, no step i1) is conducted in the biaxially oriented polyamide film process. Preferably, there is thus no further polymer (FP) provided in a further extruder in the biaxially oriented polyamide film process.

The stretched polymer film (P) obtained can, for example, be wound up subsequently to its production. Methods for this purpose are known to those skilled in the art. If the stretched polymer film (SP) is obtained in tubular form, as, for example, in the blowing process and in the multifilm blowing process, the tube can also be slit before being wound up. A slit film can then be wound up on one or more rolls.

Use of the Polymer Film (P)

The polymer film (P) of the invention can be used in any sectors known to the person skilled in the art in which polymer films are used. More particularly, the polymer film (P) according to the invention is suitable for films having high use temperatures that additionally have to be flexible. These include packaging films, for example oven bags, and technical films, for example films for casting, for example for casting of wind turbine blades. The polymer film (P) of the invention is thus especially suitable as packaging film or as technical film.

The present invention therefore also provides for the use of the polymer film (P) of the invention as technical foils or as packaging foils.

The invention claimed is:

1. A polymer film (P), comprising:
a random copolyamide consisting of, in polymerized form,
(A) 15% to 95% by weight of a first monomer mixture (M1) consisting of
(A1) a $C_4$-$C_{12}$ dicarboxylic acid and
(A2) a first $C_4$-$C_{12}$ diamine selected from the group consisting of pentamethylene-1,5-diamine, hexamethylene-1,6-diamine, decamethylene-1,10-diamine, dodecamethylene-1,12-diamine, and combinations thereof, and of
optionally (A3) a lactam,
(B) 5% to 85% by weight of a second monomer mixture (M2) consisting of
(B1) a $C_{32}$-$C_{40}$ dimer acid and
(B2) a second $C_4$-$C_{12}$ diamine selected from the group consisting of pentamethylene-1,5-diamine, hexamethylene-1,6-diamine, decamethylene-1,10-diamine, dodecamethylene-1,12-diamine, and combinations thereof, and
optionally (B3) a lactam,
where the percentages by weight of the components (A) and (B) are based on a total weight of the components (A) and (B),
wherein the copolyamide has a viscosity number ($VN_{(C)}$) ranging from 120 to 300 mL/g, determined in a 0.5% by weight solution of the copolyamide in 96% by weight sulfuric acid, and
wherein copolyamide comprises plural amide bonds formed between the $C_4$-$C_{12}$ dicarboxylic acid (A1) and the second $C_4$-$C_{12}$ diamine (B2) and/or between the first $C_4$-$C_{12}$ diamine (A2) and the $C_{32}$-$C_{40}$ dimer acid (B 1); and
wherein the copolyamide has a melting temperature in the range from 220 to 290° C., determined according to ISO 11357-3: 2014.

2. The film (P) of claim 1, wherein the component (A) consists of from 45 to 55 mol % of the component (A1) and from 45 to 55 mol % of the component (A2), and optionally the component (A3), based on a total molar amount of the component (A).

3. The film (P) of claim 1, wherein the component (B) consists of from 45 to 55 mol % of the component (B1) and from 45 to 55 mol % of the component (B2), and optionally the component (B3), based on a total molar amount of the component (B).

4. The film (P) of claim 1, wherein the component (A1) is selected from the group consisting of pentanedioic acid, hexanedioic acid, decanedioic acid, dodecanedioic acid, terephthalic acid, isophthalic acid, and combinations thereof.

5. The film (P) of claim 1, wherein the component (B1) is prepared from two or more unsaturated fatty acids selected from the group consisting of an unsaturated $C_{16}$ fatty acid, an unsaturated $C_{18}$ fatty acid, and an unsaturated $C_{20}$ fatty acid.

6. The film (P) of claim 1, wherein the copolyamide has at least one glass transition temperature ($T_{G(C)}$) ranging from −10 to 70° C.

7. The film (P) of claim 1, comprising:
a first layer comprising the copolyamide; and
a further layer comprising a further polymer (FP) selected from the group consisting of a polyolefin, a poly(ethylene-vinyl alcohol), a poly(ethylene-vinyl acetate), a polyethylene terephthalate, a polyvinylidene chloride, and/or a maleic anhydride-grafted polyolefin.

8. The film (P) of claim 1, produced in a casting process, in a blowing process, in a biaxially oriented polyamide film process, or in multifilm blowing process.

9. The film (P) of claim 1, having a thickness in a range of from 0.1 μm to 1 mm.

10. A process for producing the film (P) of claim 1, the process comprising:

extruding the copolyamide in a molten form out of a first extruder through a die to obtain a film comprising the copolyamide in molten form; and cooling the film in the molten form, with solidification of the copolyamide to obtain the polymer film (P).

11. A technical film or a packaging film, comprising:
the polymer film (P) of claim 1.

12. The film (P) of claim 1, wherein the $C_4$-$C_{12}$ dicarboxylic acid (A1) is aliphatic.

13. The film (P) of claim 1, wherein the $C_4$-$C_{12}$ dicarboxylic acid (A1) does not include any terephthalic acid or isophthalic acid.

14. The film (P) of claim 1, wherein the first monomer mixture (M1) further comprises, in reacted form, said lactam (A3).

15. The film (P) of claim 1, wherein the component (A) comprises from 47 to 53 mol % of the component (A1) and from 47 to 53 mol % of the component (A2), based on a total molar amount of the component (A).

16. The film (P) of claim 1, wherein the component (A) comprises, based on a total amount of component (A):
35 to 49.95 mol. % of component (A1);
35 to 49.95 mol. % of component (A2); and
0.1 to 25 mol. % of component (A3).

17. The film (P) of claim 1, wherein the viscosity number of the copolyamide is in a range of from 150 to 280 mL/g.

18. The film (P) of claim 1, wherein the copolyamide has a melting temperature in the range from 240 to 270° C., determined according to ISO 11357-3: 2014.

* * * * *